United States Patent
Podubrin

(10) Patent No.: US 6,836,694 B1
(45) Date of Patent: Dec. 28, 2004

(54) METHOD AND DEVICE FOR GUIDING A LASER BEAM OVER AN OBJECT

(75) Inventor: Heinz Podubrin, Wuppertal (DE)

(73) Assignee: Horst Kind GmbH, Wuppertal (DE)

( * ) Notice: Subject to any disclaimer, the term of this patent is extended or adjusted under 35 U.S.C. 154(b) by 0 days.

(21) Appl. No.: 10/221,640

(22) PCT Filed: Mar. 23, 2000

(86) PCT No.: PCT/EP00/02579

§ 371 (c)(1), (2), (4) Date: Sep. 13, 2002

(87) PCT Pub. No.: WO01/68310

PCT Pub. Date: Sep. 20, 2001

(30) Foreign Application Priority Data

Mar. 17, 2000 (DE) .......................................... 100 13 344

(51) Int. Cl.[7] .............................................. G06F 19/00
(52) U.S. Cl. ...................................... 700/134; 700/166
(58) Field of Search ................................. 700/134, 135, 700/166

(56) References Cited

U.S. PATENT DOCUMENTS

| | | | | |
|---|---|---|---|---|
| 4,905,159 A | * | 2/1990 | Loriot | 700/134 |
| 4,961,149 A | * | 10/1990 | Schneider et al. | 700/135 |
| 5,172,326 A | * | 12/1992 | Campbell et al. | 700/134 |
| 5,614,115 A | | 3/1997 | Horton et al. | |
| 5,838,573 A | * | 11/1998 | Crathern et al. | 700/230 |
| 5,886,319 A | | 3/1999 | Preston et al. | |
| 6,349,241 B1 | * | 2/2002 | Peron et al. | 700/134 |
| 6,520,057 B1 | * | 2/2003 | Steadman | 83/76.8 |

FOREIGN PATENT DOCUMENTS

| | | |
|---|---|---|
| FR | 2733447 | 10/1996 |
| WO | WO 97/19217 | 5/1997 |

* cited by examiner

Primary Examiner—Jayprakash N. Gandhi
Assistant Examiner—Elliot Frank
(74) Attorney, Agent, or Firm—Bachman & LaPointe, PC

(57) ABSTRACT

A system and method are provided for guiding a laser beam over a series of identical objects which can have varying arrangement relative to conveying and cutting apparatus. The present invention uses image position data to calculate deviations in position between a reference image and subsequent images, and to correct the cutting instructions based upon same.

8 Claims, 1 Drawing Sheet

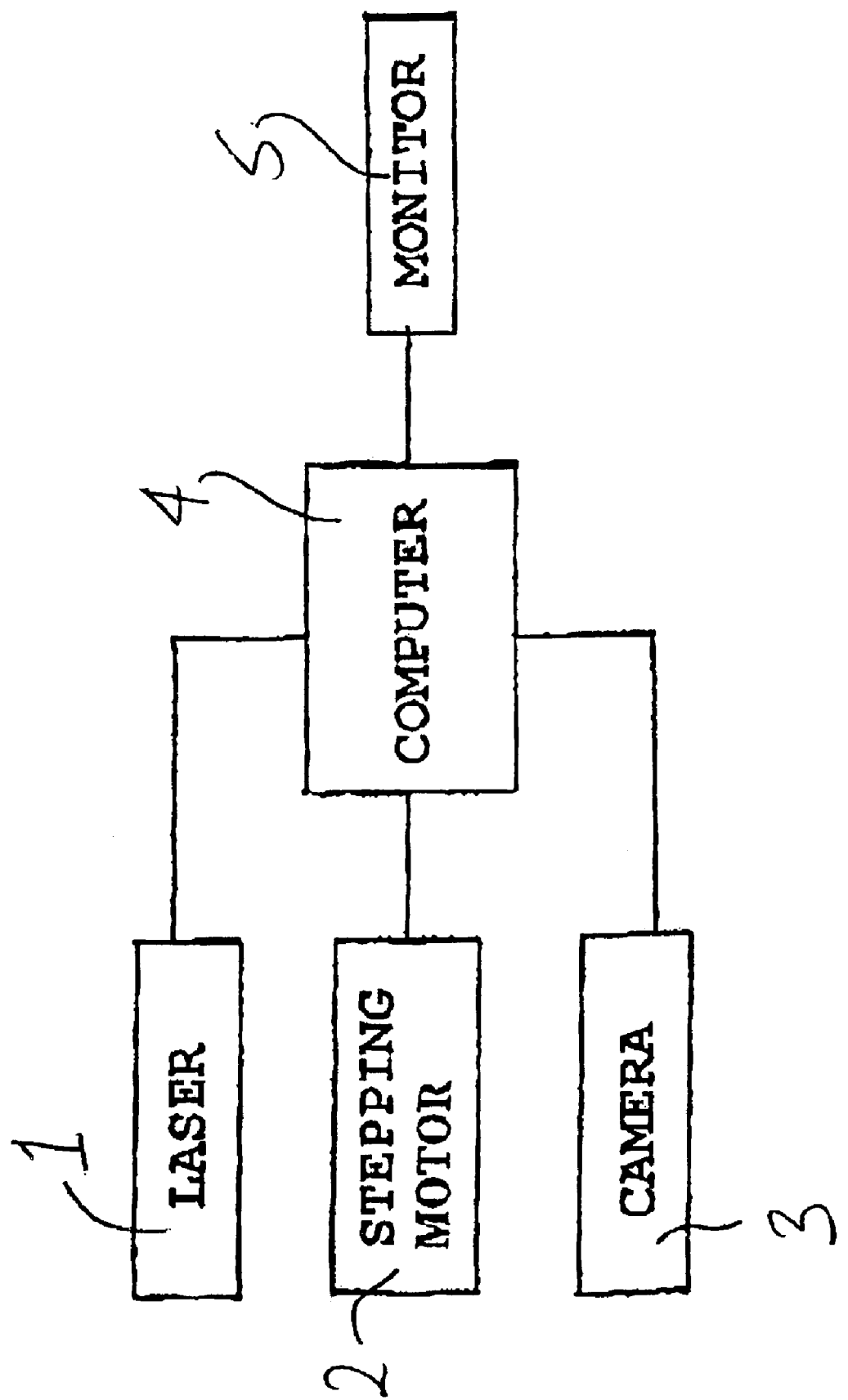

METHOD AND DEVICE FOR GUIDING A LASER BEAM OVER AN OBJECT

BACKGROUND OF THE INVENTION

The invention relates to a method and an apparatus for guiding a laser beam over an object from a plurality of identical objects, which are guided past the laser step by step in a conveying direction of the objects, substantially periodically and with a varying arrangement relative to the conveying direction, and are to be struck by the laser beam at coincident locations. In particular, the invention relates to an apparatus and a method for cutting labels out of a strip-like textile, the labels being arranged in a varying manner relative to the longitudinal or conveying direction of the labels.

Labels for textiles are produced by weaving companies and are normally present as a textile strip which has labels at substantially regular intervals, said labels containing information about a textile to be provided with the label, such as washing instructions, information about materials and clothing size. The label identification can be carried out either during the weaving operation by using threads of different colors or by printing on the textile strip.

In such label textile strips, the labels are not always at the same spacing from one another in the longitudinal direction of the textile strip. Furthermore, the labels may have angular positions with respect to the longitudinal direction of the textile strip. It is likewise possible that the labels are offset at right angles to one another in relation to the longitudinal direction of the textile strip.

It is known to guide the textile strip carrying the labels step by step past a laser cutting device by means of a transport device which comprises a stepping motor, each label dwelling in the laser operating area for a suitable time period for the cutting operation. However, before the labels are cut out of the textile strip, it must be established which section of the textile strip which comprises the label is to be cut out by the laser.

For this purpose, hitherto scissors have been used to cut a label from the textile strip by hand. By means of a scanner, an image of the label is produced and displayed on a display device. The display device is connected to a conventional computer which, for example, has cursor control. The cursor, moved by a mouse, is used to make a mark in the image of the label cut out by hand, along which the laser is to cut during the cutting operation. The image provided with the mark and relating to the label cut out by hand and to be designated as the reference object, is stored on a commercially available floppy disk. A sequence control system for the cutting operations of the laser makes access to the information on the floppy disk, so that labels guided step by step past the laser are in each case cut out accordingly by the laser.

However, this method of cutting labels out of a textile strip has the disadvantage that, given a coincident advance of the textile strip between two cutting operations, varying spacings between two adjacent labels are not taken into account, so that textile pieces which contain only part of the label can be cut out of the textile strip. As a remedy, provision has been made to provide the textile strips with a colored mark, which is arranged in front of the label at a coincident spacing in the conveying direction of the textile strip. By means of a colored-mark reader, it is determined whether a label is located at a suitable position for the laser cutting operation. However, this procedure has the disadvantage that positional changes between the labels with respect to the angular position of the labels and an offset at right angles to the conveying direction of the labels are not taken into account.

The problem described by using the example of cutting labels out of a textile strip arises in principle in all methods and apparatuses in which a laser beam is guided over an object from a plurality of identical objects which pass a laser beam operating region one after another. The problem can also occur in laser labeling.

SUMMARY OF THE INVENTION

The invention is therefore based on the object of further developing a method and an apparatus of the type mentioned at the beginning in such a way that, in the case of each of the objects, the laser beam is guided substantially over the same locations of the object.

This object is achieved by a method of guiding a laser beam over an object from a plurality of identical objects, which are guided past the laser step by step in a conveying direction of the objects, substantially periodically and with a varying arrangement relative to the conveying direction, and are to be struck by the laser beam at coincident locations, the method comprising the following steps:

a) arranging a reference object in the image plane of an optical camera;

b) recording an image of the reference object by means of the camera and displaying the image on a display device;

c) marking a point or a line which is to be struck by the laser beam on the image;

d) storing the reference object position data and the mark position data in a first memory;

e) arranging a further object in the image plane of the camera;

f) recording an image of the further object with the camera;

g) storing the object position data of the further object in a second memory;

h) calculating the deviation between the reference object position data in the first memory and the object position data of the further object in the second memory;

j) calculating the laser position(s) relative to the further object on the basis of the deviation in such a way that the laser strikes the further object at the positions marked in step c); and k) guiding the laser over the further object to the/along the laser positions calculated in step j).

According to the method, provision is therefore made firstly to record an image of a reference object and, on this image, to mark a mark of the location of an object, for example points or lines, which are to be struck by the laser beam. In order to record the reference image by means of the optical camera, the previously required cutting of a reference label out by hand, which has to be scanned by a scanner, is dispensed with. The object or the label which serves as a reference can remain on the textile strip, so that the textile strip as a whole can be moved immediately onto a transport device in order to carry out repeated cutting operations.

After the position data of the reference label and the mark have been stored, a desired number of labels can be cut out by the laser. Before each cutting operation, first of all a video image of the current object is recorded by means of the camera and local deviations between the current object and the reference object are calculated. These calculated deviations are used to control the laser.

For the example of cutting labels out of a textile strip, the result, as compared with the prior art, has the advantage that label wastage resulting from faulty cutting of the labels, for example where part of the identification is lost, is reduced by about 10 to 20%. Similar advantages result in the case of other methods in which a laser beam is to be guided over a plurality of objects. This applies in a particular for any objects which are conveyed on a transport belt above which a laser is arranged for cutting or other purposes.

In order to repeat a laser guiding operation, method steps e)–k) are carried out repeatedly.

If the objects are labels on a textile strip, the textile strip can be driven by a stepping motor, controlled by a stepping motor control system. The effect of the stepping motor is that the labels are guided one after another into the operating region of the laser, which is located in the spatial angle observed by the camera. Depending on the results of the calculation of the position deviations between reference label and current label, the laser, which is controlled by a laser control system, cuts the current label out of the textile strip.

In each step e), the stepping motor control system can be triggered by a signal from the laser control system which reproduces the completion of step k), so that the stepping motor drives the textile strip for a predetermined advance, for example 10 cm, so that the respectively following label should lie in the laser operating region. The camera spatial angle should be such that it covers the usual deviations of the labels from a spatial angle central position. However, it is not possible to completely rule out the situation in which labels are located only partly within the spatial angle of the camera. In this case, the performance of the method can be stopped and a fault message can be output.

Each step f) can be triggered by a signal from the stepping motor control system, which reproduces the completion of stop e), to a camera control system. This results in the image of the current label being recorded as soon as the label has reached a rest position.

The subject of the invention is additionally an apparatus for guiding a laser beam over an object from a plurality of identical objects, which are guided past the laser step by step in a conveying direction of the objects, substantially periodically and with a varying arrangement relative to the conveying direction, and are to be struck by the laser beam at coincident points, comprising:

- a transport device for guiding the objects into the laser operating region,
- a camera whose spatial angle covers the laser operating region,
- a memory for storing images read out by the camera,
- a display device for displaying the object images from the camera,
- a marking device for marking a point or a line which is to be struck by the laser beam on an object image.
- a computing unit for calculating deviations between various object images from the camera and
- a control unit for driving the laser on the basis of the results from the computing unit.

The invention will be described in more detail below using an exemplary embodiment.

BRIEF DESCRIPTION OF DRAWINGS

The single FIGURE shows an overview of an apparatus for guiding a laser beam over a plurality of identical objects.

DETAILED DESCRIPTION

The apparatus comprises a laser 1, a stepping motor 2 and a CCD camera 3, which are all controlled by a computer 4 as a sequence control system. The computer 4 is connected to a monitor 5.

A video image of an object, recorded by the camera 3, is read out by the computer 4 and displayed on the monitor 5. For example, the computer 4 can be equipped with a mouse whose position is displayed on the monitor as a cursor. By actuating the mouse, a mark may be made in the video image displayed on the monitor 5. A reference image of an object, provided with the mark, is stored in a section of the memory of the computer 4.

After this procedure has been completed, in the case in which the apparatus is used for cutting labels from a textile strip, the continuous operation is initiated. First of all, the computer 4 sends a signal to the stepping motor 2, so that the next label, that is to say the label which follows the reference label, passes into the spatial angle of the camera 4. After the next label has assumed a rest position, the stepping motor 2 sends a signal to the computer 4 which reproduces the completion of the advance step for the label. The computer 4 then drives the camera 3 so that an image of the object located in the spatial angle of the camera is recorded. The camera image is read out and stored by the computer. The computer 4 then calculates positional deviations of the reference label from the label just recorded. These deviations include angular deviations relative to the longitudinal direction of the textile strip, lateral offset at right angles to the longitudinal direction of the textile strip, and offset in the direction of the textile strip. The data obtained by the calculation is used to calculate the positions at which the marks defined in the reference image are located in the image of the current label.

The calculated positions of the marks in the current image are used by the computer 4 for controlling the position of the laser 1. The cutting operation by means of the laser 1 then takes place. As soon as the cutting operation of the laser 1 has been completed, the laser 1 outputs a signal to the computer 4 which reproduces the completion of the cutting operation. By means of the computer 4, this signal triggers further actuation of the stepping motor 2. The further sequence of the method is repeated in any desired number.

In order to prepare the laser cutting operations, data about the spacing to be expected between two labels on the textile strip can be entered into the computer 4 at the beginning, so that the stepping motor 2 contains suitable predefinitions for an advance. Furthermore, data about the likely number of labels can also be entered into the computer 4.

In order to perform the calculations, the computer 4 contains image processing software, which is used to calculate the deviations in the position data between a reference label and a current label.

What is claimed is:

1. A method for guiding a laser beam over an object from a plurality of identical objects which are conveyed step by step and substantially periodically past the laser, and wherein said objects have a varying arrangement relative to the conveying direction, and are struck at coincident locations by the laser beam, the method comprising the following steps:

a) arranging a reference object in the image plane of an optical camera;

b) recording an image of the reference object by means of the camera and displaying the image on a display device;

c) marking a point of a line which is to be struck by the laser beam on the image;

d) storing the reference object position data and the mark position data from steps b) and c) in a first memory;

e) arranging a further object in the image plane of the camera;

f) recording an image of the further object with the camera;

g) storing the object position data of the further object from step f) in a second memory;

h) calculating the deviation between the reference object position data in the first memory and the object position data of the further object in the second memory;

j) calculating the laser position(s) relative to the further object on the basis of the deviation in such a way that the laser strikes the further object at the positions marked in step c); and k) guiding the laser over the further object to the/along the laser position(s) calculated in step j).

2. The method as claimed in claim 1, in which method steps e) to )k are carried our repeatedly.

3. The method as claimed in claim 1 or 2, in which the objects are textile labels which are provided in a textile strip.

4. The method as claimed in claim 3, in which the textile strip is driven by a stepping motor, controlled by a stepping motor control system, and the labels are cut out of the textile strip by the laser, controlled by a laser control system.

5. The method as claimed in claim 4, in which each step e) is triggered by a signal from the laser control system, which reproduces the completion of the step k), to the stepping motor control system.

6. The method as claimed in claim 5, in which each step f) is triggered by a signal from the stepping motor control system, which reproduces the completion of step e), to a camera control system.

7. An apparatus for guiding a laser beam over an object from a plurality of identical objects conveyed step by step and substantially periodically past the laser, and wherein said objects have a varying arrangement relative to the conveying direction, and are struck at coincident locations by the laser beam, comprising:

a transport device for guiding the objects into the laser operating region, a camera whose spatial angle covers the laser operating region, a memory for storing images read out by the camera, a display device for displaying the object images from the camera, a marking device for marking a point or a line which is to be struck by the laser beam on a reference object image, a computing unit for calculating deviations between reference object position data and further object position data from the camera and a control unit for driving the laser on the basis of the results from the computing unit to correct for the deviation and to guide the laser beam to a point relative to the further object which corresponds in location to the point on the reference object.

8. A method for guiding a laser beam over an object from a plurality of identical objects which are conveyed step by step and substantially periodically past the laser, and wherein said objects have a varying arrangement relative to the conveying direction, and are struck at coincident locations by the laser beam, the method comprising:

obtaining a reference object position data and reference cutting positions relative to the reference object to be struck by the laser beams;

recording an image of a further object with a camera;

obtaining further object position data from the image;

calculating deviation between the reference object position data and the further object position data;

determining corrected cutting positions for the further object based upon the reference cutting positions and the deviation; and guiding the laser beam to the corrected cutting positions.

* * * * *